Patented June 1, 1937

2,082,559

UNITED STATES PATENT OFFICE 2,082,559

METHOD OF COATING FIBROUS MATERIAL

Morgan J. Vittengl, Fairfield, Conn., assignor to E. I. du Pont de Nemours & Company, Wilmington, Del., a corporation of Delaware No Drawing. Application September 1, 1934, Serial No. 742,448

4 Claims. (Cl. 91—68)

This invention relates to a method of coating fibrous base materials with rubber compositions, and more particularly to a method of coating fibrous base materials with rubber latex.

The methods commonly used to coat fibrous base material with rubber compositions fall into three general classes. A commonly used method comprises forming a thin sheet of a suitable rubber composition, pressing the film on the fibrous base material, and thus producing a rubber composition coated fibrous base material. The fibrous base may be either of a woven or non-woven construction. A calender is used for this operation and forms sheets of the rubber composition and applies it to the base material in essentially one operation. Another method consists in applying a rubber composition in the form of a dispersion in a suitable dispersing medium to the fibrous base material by means of a spreading knife device. The rubber composition is dispersed in such materials as benzol or its homologues, straight chain hydrocarbons such as naphtha, gasoline, or other commonly known so-called rubber solvents. Aqueous dispersions of rubber compositions are also applied to suitable base materials in this manner. Consistency of the material to be spread may vary over wide limits, depending on the type of base material to be coated and other factors well known to those skilled in the art. After the composition is applied to the base the volatile constituent is removed by heat according to well known procedures. The resulting material is a fibrous base with a rubber composition film on one side or, if desired, both sides may be coated according to this procedure.

Still another method, more recently used, is that in which rubber latex is spread on a fibrous base material and the volatile material, which in this instance is water, evaporated by exposure of the coated base to the action of heat thus depositing a film of rubber on the fibrous base. This method constitutes the latest practice in rubberizing fabrics and has the advantage of yielding materials of light weight which are desirable for many purposes such as raincoats, sanitary garments, shower bath curtains, etc. Experience has shown, however, that unsatisfactory results are obtained when the rubber latex is applied directly to the fibrous base due to the tendency of the latex to penetrate the interstices of the fabric causing a stiffening in the resultant rubberized base. This stiffening is probably due to the tightening of the weave or general construction of the fibrous base, due to shrinkage induced by the evaporation of the water in the latex; to the filling of the interstices of the base thus preventing the collapse of the structure upon flexing, or in other words, reducing the tendency of the fibers to slide over one another when the base material is subjected to flexing. To overcome this difficulty, it has been proposed to pre-treat the base material with a water repellent material previous to the application of the rubber latex in order to prevent infiltration of the rubber latex into the interstices of the base.

United States Patent No. 1,784,523 issued to Hopkinson discloses such a method in which a water repellent or waterproof coating is first applied to the fibrous base and such may be followed by the application of rubber latex. I have found, however, that due to the water repellent nature of this film or coating it is quite difficult and practically impossible to cause the rubber latex to spread in a coherent homogeneous film over the pre-treated fibrous base material. The rubber latex is, of course, an aqueous dispersion of rubber and as such does not spread evenly over a water repellent surface due to the lowered interfacial tension between the two surfaces. As a result the rubber latex tends to gather in globules rather than to spread uniformly over the water repellent treated surface. In drying it produces a rough finished rubber surface which is unattractive and unsatisfactory for many purposes.

This invention has as an object the provision of a method to facilitate the application of aqueous dispersions over normally water repellent surfaces to yield smooth coherent and homogeneous films of the applied dispersion.

A further object is the provision of a method for the treatment of water repellent surfaces to reduce the surface tension of such surfaces and thus promote wetting of the water repellent surface by aqueous dispersions.

A still further object is the treatment of a fibrous base material coated with a rubber composition cement so as to promote a uniform film deposition when rubber latex is subsequently spread over the treated rubber composition coated surface.

These objects are accomplished by the following invention in which the water repellent and/or waterproofed cloth or other fibrous base material is treated with a suitable agent which reduces the surface tension of the water repellent and/or waterproofed surface to which aqueous dispersions are subsequently applied.

A preferred embodiment of this invention is carried out according to the following procedure.

The fibrous base material to be rubberized is coated with a rubber composition cement by any conventional means well known in the art, preferably by means of a spreader knife. This coating is to seal the interstices of the fabric so as to prevent or reduce to a minimum the infiltration of the rubber latex which is subsequently applied. A rubber composition cement which has been found suitable for this purpose comprises:

| | Pounds |
|---|---|
| Pale crepe rubber | 75 |
| Corn oil rubber substitute | 25 |
| | 100 |

These constituents are milled into a homogeneous mass by means well known in the art of rubber composition compounding and then dispersed in a hydrocarbon dispersing medium such as gasoline, naphtha, benzol, etc., to produce a suitable spreading composition. The constituents of this water repellent and waterproof composition may vary between 100% of the pale crepe rubber and 60% of pale crepe rubber with 40% of the rubber substitute. A suitable spreading composition may be prepared by dispersing 15 parts by weight of the rubber mixture in 85 parts by weight of gasoline. Other proportions may be used, the principal controlling factor being the production of a spreading composition having the desired viscosity which will result upon application to the fibrous base material in a smooth film. After the rubber composition cement has been applied, the volatile constituents are removed with the aid of heat and the resulting rubber composition surface treated with an agent which will reduce the surface tension. Powdered mica has been found to serve this purpose very well. Rubber latex is then applied to the mica treated rubber surface and the aqueous constituent of the latex removed by means of heat. The percentage of rubber in the latex is not critical and any of the ordinary commercially available emulsions will serve. Latex having a 40% rubber content, for example, is satisfactory. A plurality of coats of rubber latex may be deposited without any intervening treatment with the surface tension reducing agents. After the desired amount of rubber latex has been applied, the product is ready for use or may be subjected to other treatments such as decoration, vulcanization, etc., which are well known and practiced in the art.

While mica is mentioned as the surface tension reducing material in the description of preferred embodiment of the invention, other materials of a similar nature such as sericite mica, corn or potato starch and talc may be used with satisfaction. Other surface tension reducing agents such as those commonly known as wetting agents may be used to yield the desired result. Among these may be mentioned such materials as alkylated naphthalene sulphonic acids, for example, the sodium salt of iso-propyl naphthalene sulphonic acid or the free acid of such alkylated naphthalene sulphonic acids, alkali salts of abietine sulphonic acid, etc. The rubber composition base film is treated with the surface tension reducing materials usually by means of dusting. The so-called wetting agents may be used by incorporating them directly into the rubber latex which is subsequently applied to the rubber composition base film.

This invention is applicable to the production of light weight rubber coated fibrous base material in which extreme flexibility is the outstanding characteristic. Among such products may be mentioned suitable rubberized fabric for raincoats, rain capes, sanitary articles of clothing, shower bath curtains and many other similar products which require as inherent qualities extreme pliability and water repellency or waterproofness.

The principal advantage of the invention is the provision of a method whereby rubber latex may be applied to a fibrous base material, which has previously been surface treated with a water repellent material, in order to produce a product of practical value having an exceptionally pleasing appearance.

It is apparent that many widely different embodiments of this invention may be made without departing from the spirit and scope thereof and, therefore, it is not intended to be limited except as indicated in the appended claims.

I claim:

1. Process of preparing waterproof fabric which comprises applying to a suitable sheet fabric a thin coat of a 15% dispersion of rubber in gasoline, removing the gasoline, dusting the coated fabric with powdered mica, removing the surplus, applying a plurality of coats of latex containing about 40% rubber, and vulcanizing.

2. A rubberized fabric comprising a fabric base portion, a thin layer of rubber, a thin layer of material selected from the class consisting of mica, starch, alkali-metal salts of iso-propyl-naphthalene sulfonic acids, iso-propyl-naphthalene sulfonic acid, alkali salts of abietine sulfonic acid and talc, and at least one layer of rubber, the latter having been applied as latex.

3. In the process of treating fabrics with compositions containing rubber, the process which comprises applying a sufficient water repellent coating of a non-aqueous rubber dispersion to the fabric to overcome infiltration of aqueous latex, applying a coating of substance which reduces the surface tension selected from the class consisting of powdered mica, talc, starch, alkali-metal salts of iso-propyl-naphthalene sulfonic acids, iso-propyl-naphthalene sulfonic acid, and alkali salts of abietine sulfonic acid, and then applying a coating of aqueous latex composition.

4. The process of preparing water proof fabric having the light weight of a latex-coated fabric and lack of stiffness resulting from direct coating of a fabric with latex which comprises applying to a suitable fabric a water-repellent coating to seal the interstices of the fabric and fibers and minimize the susceptibility of the resultant to the infiltration of aqueous latex, dusting the thus coated fabric with an alkali-metal salt of iso-propyl-naphthalene sulfonic acid and thereafter spreading thereon a coat of aqueous latex.

MORGAN J. VITTENGL.